Patented July 5, 1949

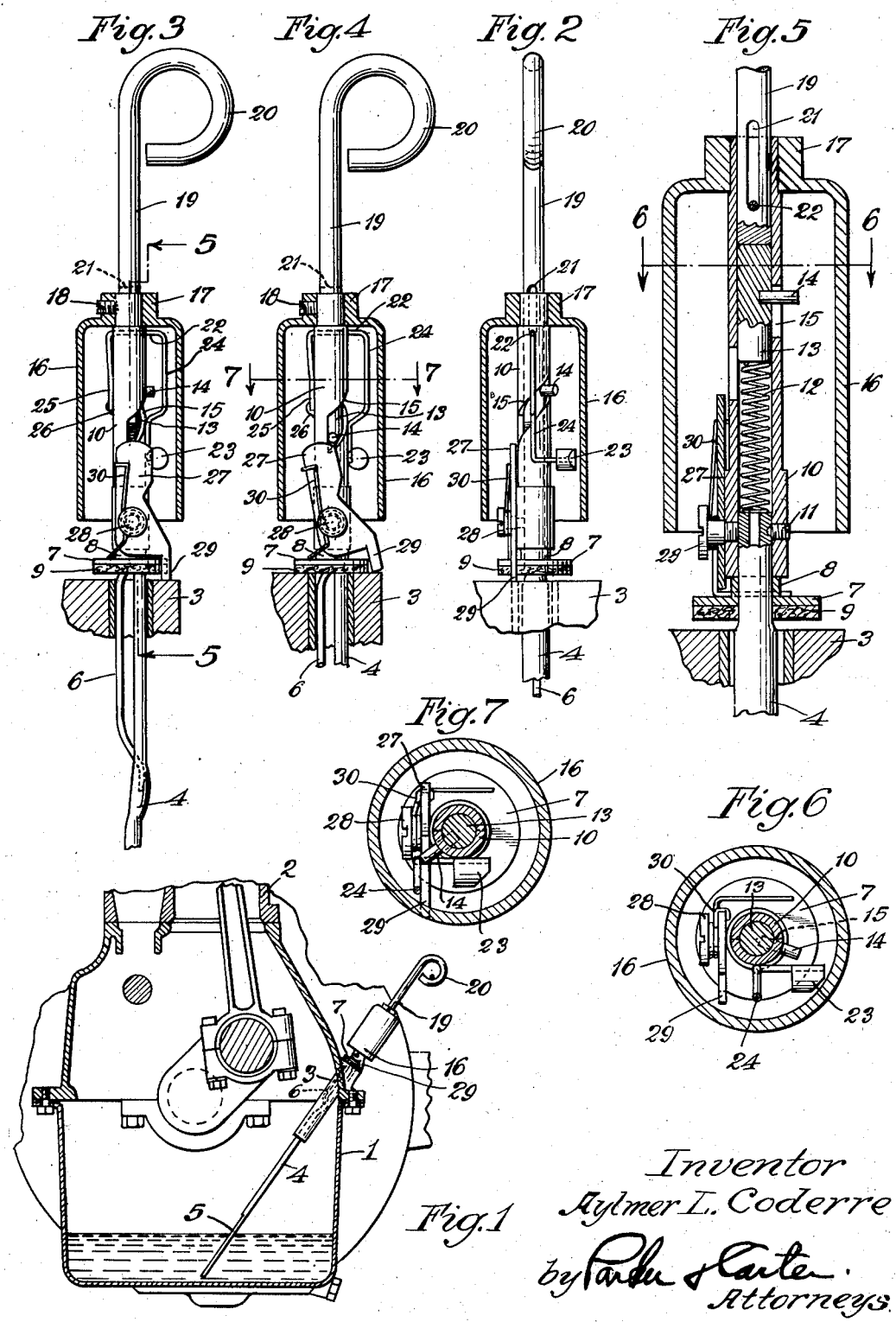

2,474,805

UNITED STATES PATENT OFFICE 2,474,805

LIQUID MEASURING DEVICE

Aylmer L. Coderre, St. Anne, Ill.

Application February 13, 1947, Serial No. 728,345

27 Claims. (Cl. 116—67)

This invention relates to a measuring device and particularly to a device for measuring the level of liquid in a container. It has for one object to provide an accurate measuring device.

It has for another object to provide a guard or warning means to insure that the measurement has been accurately taken.

It has for another object to provide an audible means for indicating that the measurement has been accurately made.

It has for another object to provide a latching means to prevent fraudulent or inaccurate operation of the device.

Other objects will appear from time to time throughout the specification and claims.

The invention is illustrated more or less diagrammatically in the accompanying drawings, wherein:

Figure 1 is a section through the crankcase of an engine, illustrating the device in position of use;

Figure 2 is a section taken on an enlarged scale, with parts shown in elevation, illustrating the device at the commencement of operation;

Figure 3 is a similar section with parts in elevation, illustrating the device in the same position, but rotated through an angle of 90° with respect to the showing of Figure 2;

Figure 4 is a view similar to Figure 3, showing the device at the completion of operation;

Figure 5 is a sectional detail taken at line 5—5 of Figure 3 on an enlarged scale;

Figure 6 is a transverse section taken at line 6—6 of Figure 5; and

Figure 7 is a transverse section taken at line 7—7 of Figure 4 on the same scale as that used in Figure 6.

Like parts are indicated by like characters throughout the specification and the drawings.

Although the invention may be used for measuring the liquid in any container, it is illustrated herewith as being used for measuring the level of oil or lubricant in the crankcase 1 of an internal combustion engine 2. A tubular fitting 3 is fixed in an opening in the crankcase and the instrument is inserted in this fitting. The instrument includes a measuring stick 4 which may be flattened, as at 5, and may include a spring 6. The invention is not limited to the particular details of any measuring stick and these details are shown only sufficiently to illustrate the operation of the device.

Positioned about the upper portion of the stick 4 is a disc 7 which may have an integral collar 8. The member 7 is preferably loose upon the stick 4 so that it may slide up and down to some degree and may tilt with respect to that member. A packing or sealing member 9 may be positioned about the stick 4 beneath the disc 7.

Fixed to the upper end of the stick 4 is a tubular member 10. It may be held in place by a set screw 11. Positioned in the member 10 is a spring 12. A plunger 13 is positioned within the member 10 above the spring and carries a cam pin 14 which projects through a cam slot 15.

A bell 16 is provided with a collar 17 and is fixed upon the upper end of the member 10 by a set screw 18. An operating rod 19 is positioned to slide in the tubular member 10 and may terminate at its upper end in a curved handle like portion 20. Any other handle might be provided, if desired.

The rod 19 is slotted, as at 21, and a pin 22 which is fixed in the tubular member 10 extends through the slot 21 and prevents displacement of the parts but permits the desired degree of motion. A bell clapper 23 is mounted upon the free end of a spring bell carrier 24. This carrier is secured to the tubular member 10 and may extend through it, comprising the pin 22. Its one end 25 is secured to the tubular member 10 by welding 26, or otherwise.

If the bell carrier is inserted as shown and as just described, it serves the dual purpose of carrying the clapper and of controlling the movement of the device. The latching member 27 is pivoted, as at 28, on the tubular member 10. At its upper end, as shown particularly in Figures 3 and 4, it may extend across the lower portion of the cam slot 15. The bell carrier 24 also extends across the cam slot 15 and may be outwardly bent, as shown particularly in Figures 3 and 4.

At its lower end the latch 27 is provided with a laterally spaced portion 29 shaped to overlie and extend downwardly beyond the members 7 and 9 and to contact the fitting 3. A spring 30 is biased to hold the latch in the position of Figure 3, in which its upper end extends across the lower portion of the cam slot 15 and thus into the path of the pin 14 on the member 13.

Although I have shown an operative form of my invention, it will be recognized that many changes in the form, shape and arrangement of parts can be made without departing from the spirit of the invention, and my showing is therefore to be taken as, in a sense, diagrammatic.

The use and operation of this invention are as follows:

The device in the form shown is suitable for an oil stick. Normally it is in the position of Figure 1. When it is desired to measure the oil within the crankcase, it is withdrawn and wiped. It is then reinserted. It comes first to the position of Figure 3. In that position the latch 27 lies across the lower portion of the cam slot 15. If the device is depressed, the portion 29 of the latch first comes in contact with the fitting 3 and is tilted from the position of Figure 3 to that of Figure 4, thus moving out of the path of the pin 14.

As the device is further depressed, the member 13 is moved downwardly against the resistance of the spring 12 and the pin moves from the upper part of the cam into contact with the lower cam surface and is then guided downwardly and about, following the lower cam surface.

In this movement it contacts that portion of the bell carrier 24 which lies close to the tubular member 10 and trips it. When it has tripped it and moved out of contact with it, the spring carrier 24 moves the clapper to strike the bell. This will not occur until the stick has been moved down fully and thus the bell cannot be rung until the stick is fully inserted. Therefore, the operator receives an audible signal indicating that the stick has been fully inserted. Thereafter the stick is withdrawn and gives an accurate reading of the depth of liquid within the tank or container.

The latching means might be eliminated and the device would simply be inserted until the collar 7 is in contact with the fitting 3 and further pressure will cause the bell to be rung and give the audible signal in the same manner as that in which it is given when the latch is present. The latch merely insures a complete insertion of the device, because the bell cannot be freed for ringing by manipulation of the thumb or any other fraudulent use.

I claim:

1. In combination in a liquid level measuring device, a measuring rod, a member fixed thereto, a handle supported in said member, said member being provided with a cam slot, a plunger within said member, and a cam follower fixed to said plunger and projecting through said cam slot, a bell carried by said member, a clapper for said bell, and a support for said clapper, said support extending across said cam slot and shaped to be contacted by the cam follower at one portion of the latter's movement along the cam slot.

2. In combination in a liquid level measuring device, a measuring rod, a member fixed thereto, a handle supported in said member, said member being provided with a cam slot, a plunger within said member, and a cam follower fixed to said plunger and projecting through said cam slot, a bell carried by said member, a clapper for said bell, and a support for said clapper, said support extending across said cam slot and shaped to be contacted by the cam follower at one portion of the latter's movement along the cam slot, and latching means extending into the path of the clapper support, a spring biased to hold said latch in latching position, said latch shaped to contact the liquid container in which the liquid is positioned, and provided with a member adapted to strike a portion of the container, whereby the latch is moved against its spring to free the clapper support for striking movement.

3. In combination in a liquid level measuring device, a measuring rod, a tubular member fixed thereto, a handle supported in said tubular member, said tubular member being provided with a cam slot, a plunger within said tubular member, and a cam follower fixed to said plunger and projecting through said cam slot, a bell carried by said tubular member, a clapper for said bell, and a support for said clapper, said support extending across said cam slot and shaped to be contacted by the cam follower at one portion of the latter's movement along the cam slot.

4. In combination in a liquid level measuring device, a measuring rod, a member fixed thereto, a handle supported in said member, said member being provided with a cam slot, a plunger within said member, and a cam follower fixed to said plunger and projecting through said cam slot, a bell carried by said member, a clapper for said bell, and a spring support for said clapper, said spring support extending across said cam slot and shaped to be contacted by the cam follower at one portion of the latter's movement along the cam slot.

5. In combination in a liquid level measuring device, a measuring rod, a tubular member fixed thereto, a handle supported in said tubular member, said tubular member being provided with a cam slot, a plunger within said tubular member, and a cam follower fixed to said plunger and projecting through said cam slot, a bell carried by said tubular member, a clapper for said bell, and a spring support for said clapper, said spring support extending across said cam slot and shaped to be contacted by the cam follower at one portion of the latter's movement along the cam slot.

6. In combination in a liquid level measuring device, a measuring rod, a member fixed thereto, a handle supported in said member, said member being provided with a downwardly inclined cam slot, a plunger within said member, and a cam follower fixed to said plunger and projecting through said cam slot, a bell carried by said member, a clapper for said bell, and a support for said clapper, said support extending across said cam slot and shaped to be contacted by the cam follower at one portion of the latter's movement along the cam slot.

7. In combination in a liquid level measuring device, a measuring rod, a tubular member fixed thereto, a handle supported in said tubular member, said tubular member being provided with a downwardly inclined cam slot, a plunger within said tubular member, and a cam follower fixed to said plunger and projecting through said cam slot, a bell carried by said tubular member, a clapper for said bell, and a support for said clapper, said support extending across said cam slot and shaped to be contacted by the cam follower at one portion of the latter's movement along the cam slot.

8. In combination in a liquid level measuring device, a measuring rod, a tubular member fixed thereto, a handle supported in said tubular member, said tubular member being provided with a downwardly inclined cam slot, a plunger within said tubular member, and a cam follower fixed to said plunger and projecting through said cam slot, a bell carried by said tubular member, a clapper for said bell, and a spring support for said clapper, said spring support extending across said cam slot and shaped to be contacted by the cam follower at one portion of the latter's movement along the cam slot.

9. In combination in a liquid level measuring device, a measuring rod, a tubular member fixed thereto, a handle supported in said tubular member, said tubular member being provided with a downwardly inclined cam slot, a plunger within said tubular member, and a cam follower fixed to said plunger and projecting through said cam slot, a bell carried by said tubular member, a clapper for said bell, and a spring support for said clapper, said spring support extending across said cam slot and shaped to be contacted by the cam follower at one portion of the latter's movement along the cam slot, and latching means extending into the path of the clapper support, and a spring biased to hold said latch in latching position, said latch shaped to contact the liquid container in which the liquid is positioned, and provided with a member adapted to strike a portion of the container, whereby the latch is moved against its spring to free the clapper support for striking movement.

10. In combination in a liquid level measuring device, a measuring rod, and an audible signal device mounted thereon for movement therewith, said signal device including an actuating member, supported from said rod, and movable with respect thereto, and a bell and a bell striker for striking it, and a part movable with said actuating member adapted to actuate the bell striker.

11. In combination in a liquid level measuring device, a measuring rod, and an audible signal device mounted thereon for movement therewith, said signal device including an actuating member, supported from said rod, and movable with respect thereto, and a bell and a member for striking it, a part movable with said actuating member adapted to actuate the bell striker, and means for latching said bell striker against movement, said latching means including a part adapted, when the measuring device is thrust home, to contact a portion of the container in which the liquid stands, and to be moved to the unlatching position.

12. In combination in a liquid level measuring device, a measuring rod, a bell supported therefrom, and means for actuating said bell, said means including a striker, and a movable support therefor, and means for moving said striker support, a plunger positioned for movement with respect to said rod, a cam slot adjacent said plunger, a cam follower on said plunger extending into said cam slot, said cam follower adapted to contact said striker support and to move it to ring said bell.

13. In combination in a liquid level measuring device, a measuring rod, an actuating member mounted thereon for longitudinal and rotary movement with respect thereto, means defining a cam slot, a cam follower positioned on said actuating member and extending through said cam slot, a bell and a bell clapper, and a member supporting said clapper, the cam follower projecting through said cam slot and adapted, as it is moved to contact said clapper support, and a latch adapted in one position to latch said clapper against striking movement, said latch including a part adapted to contact the container in which the liquid is positioned and to free the clapper for bell striking movement.

14. In combination, an elongated member, a cam slot formed therein, a part positioned to be moved with respect to said member and having a follower extending into said cam slot, a spring biased to hold said part in one position, and a handle adapted to be used to move said part longitudinally with respect to said member, said follower upon such movement being directed along said cam slot, and a second member extending into the path of said follower and adapted to be moved thereby.

15. In combination, an elongated member, a cam slot formed therein, a part positioned to be moved with respect to said member and having a follower extending into said cam slot, a spring biased to hold said part in one position, and a handle adapted to be used to move said part longitudinally with respect to said member, said follower upon such movement being directed along said cam slot, and a second member extending into the path of said follower and adapted to be moved thereby, and a movable latch adapted to extend into the path of said second member, and a spring biased to hold said latch in latching position to limit movement of said follower and of said second member.

16. As an article of manufacture, a rod, a cylindrical member fixed thereto and axially aligned therewith, a member movably positioned within said cylinder, an inclined cam slot in said cylinder, a follower positioned on said member and extending through said slot, a spring biased to move said member to carry said follower to one end of the slot, and a handle portion extending into the cylinder and in contact with said member and adapted to be moved to depress the member against the resistance of the spring, a part extending across said slot and adapted to be contacted by the follower as the latter moves along the slot, and a latching member movably mounted on the cylinder, a spring for said latching member biased to hold said latching member in the path of said part, and a portion on said latching member adapted to be contacted and to move said latching member against its spring out of the path of said part.

17. In combination in a liquid level measuring device, a measuring rod, and an audible signal device mounted thereon, said signal device including an actuating member, supported from said rod, and movable with respect thereto, and a bell mounted on said rod and a bell striker carried by said rod for striking said bell, and a part movable with said actuating member adapted to actuate the bell striker, said bell enclosing said striking part.

18. In combination in a liquid level measuring device, a measuring rod, and an audible signal device mounted thereon, said signal device including an actuating member, supported from said rod, and movable with respect thereto, and a bell and a bell striker for striking it, and a part movable with said actuating member adapted to actuate the bell striker, said bell enclosing said striking part and the means for actuating it.

19. In combination in a liquid level measuring device, a measuring rod, and an audible signal device carried thereby, said signal device including an actuating member, supported from said rod, and movable with respect thereto, and a bell and a member for striking it, a part movable with said actuating member adapted to actuate the bell striker, and means for latching said bell striker against movement, said latching means including a part adapted, when the measuring device is thrust home, to contact a portion of the container in which the liquid stands, and to be moved to the unlatching position, said bell enclosing said bell striker and said latching means and the means to actuate said striker.

20. In combination in a unitary liquid level measuring device, a unitary assembly comprising a rod adapted to be inserted into an opening in a liquid container, an audible signal device carried by said rod, said signal device including an actuating member, supported from said rod, and movable with respect thereto, and a bell mounted on said rod, and a member carried by said rod for striking said bell to ring it, and a part movable with said actuating member and adapted to actuate the bell striker, said bell enclosing substantially all of said parts.

21. In combination in a liquid level measuring device, a measuring stick, a bell mounted on said stick, and means for ringing the bell when the stick has been inserted a predetermined distance into a liquid container, said ringing means including a member movably mounted upon said stick and projecting downwardly, a guide within which said member is mounted for movement, a cam slot formed in said guide adjacent said member, a cam follower fixed on said member and projecting into said slot, a bell clapper and a movable support therefor, said support including a spring part and carrying said clapper in one end, said spring part extending across said cam slot and adapted to be moved by said cam follower when said member is moved with respect to said cam slot.

22. In combination in a liquid level measuring device, a measuring stick, a bell mounted on said stick, and means for ringing the bell when the stick has been inserted a predetermined distance into a liquid container, said ringing means including a member movably mounted upon said stick and projecting downwardly, a guide within which said member is mounted for movement, a cam slot formed in said guide adjacent said member, a cam follower fixed on said member and projecting into said slot, a bell clapper and a movable support therefor, said support including a spring part carrying said clapper in one end, said spring part extending across said cam slot and adapted to be moved by said cam follower when said member is moved in one direction with respect to said cam slot.

23. In combination in a liquid level measuring device, a measuring stick, a bell mounted on said stick, and means for ringing the bell when the stick has been inserted a predetermined distance into a liquid container, said ringing means including a member movably mounted upon said stick and projecting downwardly, a guide within which said member is mounted for movement, a cam slot formed in said guide adjacent said member, a cam follower fixed on said member and projecting into said slot, a bell clapper and a movable support therefor, said support including a spring part carrying said clapper in one end, said spring part extending across said cam slot and adapted to be moved by said cam follower when said member is moved with respect to said cam slot, said spring part being bent away from said cam follower, whereby the cam follower may move in one direction along the cam slot without contacting said spring part.

24. In combination in a liquid level measuring device, a measuring stick, a bell mounted on said stick, and means for ringing the bell when the stick has been inserted a predetermined distance into a liquid container, said ringing means including a member movably mounted upon said stick and projecting downwardly, a guide within which said member is mounted for movement, a cam slot formed in said guide adjacent said member, a cam follower fixed on said member and projecting into said slot, a bell clapper and a movable support therefor, said support including a spring part carrying said clapper in one end, said spring part extending across said cam slot and adapted to be moved by said cam follower when said member is moved in one direction with respect to said cam slot, said spring part being bent away from said cam follower, whereby the cam follower may move in one direction along the cam slot without contacting said spring part.

25. In combination in a liquid level measuring device, a measuring stick, a bell mounted on said stick, and means for ringing the bell when the stick has been inserted a predetermined distance into a liquid container, said ringing means including a member movably mounted upon said stick and projecting downwardly, a guide within which said member is mounted for movement, a cam slot formed in said guide adjacent said member, a cam follower fixed on said member and projecting into said slot, a bell clapper and a movable support therefor, said support including a spring part fixed at one end with respect to said stick and carrying said clapper at its other end, said spring part extending across said cam slot and adapted to be moved by said cam follower when said member is moved with respect to said cam slot.

26. In combination in a liquid level measuring device, a measuring stick, a bell mounted on said stick, and means for ringing the bell when the stick has been inserted a predetermined distance into a liquid container, said ringing means including a member movably mounted upon said stick and projecting downwardly, a guide within which said member is mounted for movement, a cam slot formed in said guide adjacent said member, a cam follower fixed on said member and projecting into said slot, a bell clapper and a movable support therefor, said support including a spring part fixed at one end with respect to said stick and carrying said clapper at its other end, said spring part extending across said cam slot and adapted to be moved by said cam follower when said member is moved in one direction with respect to said cam slot.

27. In combination in a liquid level measuring device, a measuring stick, a bell mounted on said stick, and means for ringing the bell when the stick has been inserted a predetermined distance into a liquid container, said ringing means including a member movably mounted upon said stick and projecting downwardly, a guide within which said member is mounted for movement, a cam slot formed in said guide adjacent said member, a cam follower fixed on said member and projecting into said slot, a bell clapper and a movable support therefor, said support including a spring part fixed at one end with respect to said stick and carrying said clapper at its other end, said spring part extending across said cam slot and adapted to be moved by said cam follower when said member is moved in one direction with respect to said cam slot, said spring part being bent away from said cam follower, whereby the cam follower may move in one direction along the cam slot without contacting said spring part.

AYLMER L. CODERRE.

REFERENCES CITED

The following references are of record in the file of this patent:

UNITED STATES PATENTS

| Number | Name | Date |
| --- | --- | --- |
| 912,056 | Armstrong | Feb. 9, 1909 |
| 2,314,430 | Smith | Mar. 23, 1943 |